United States Patent
Lübke et al.

(10) Patent No.: US 9,528,583 B2
(45) Date of Patent: Dec. 27, 2016

(54) DUAL CLUTCH GEARBOX WITH COUNTERSHAFT DESIGN

(71) Applicant: ZF Friedrichshafen AG, Friedrichshafen (DE)

(72) Inventors: Eckhardt Lübke, Friedrichshafen (DE); Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 63 days.

(21) Appl. No.: 14/437,848

(22) PCT Filed: Oct. 1, 2013

(86) PCT No.: PCT/EP2013/070388
§ 371 (c)(1),
(2) Date: Apr. 23, 2015

(87) PCT Pub. No.: WO2014/067734
PCT Pub. Date: May 8, 2014

(65) Prior Publication Data
US 2015/0292606 A1    Oct. 15, 2015

(30) Foreign Application Priority Data

Nov. 5, 2012    (DE) .......................... 10 2012 220 063

(51) Int. Cl.
*F16H 3/08* (2006.01)
*F16H 37/04* (2006.01)
(Continued)

(52) U.S. Cl.
CPC ............... *F16H 37/046* (2013.01); *B60K 6/48* (2013.01); *B60W 10/111* (2013.01);
(Continued)

(58) Field of Classification Search
CPC .. F16H 3/006; F16H 2003/0931; F16H 3/091; F16H 47/02
(Continued)

(56) References Cited

U.S. PATENT DOCUMENTS 7,231,843 B2 * 6/2007 Gumpoltsberger ..... F16H 3/006
74/329
8,051,732 B2    11/2011 Gitt
(Continued)

FOREIGN PATENT DOCUMENTS

DE    10 2005 044 068 A1    3/2007
DE    10 2007 047 671 A1    4/2009
(Continued)

OTHER PUBLICATIONS

International Search Report Corresponding to PCT/EP2013/070388 mailed Apr. 10, 2014.
(Continued)

*Primary Examiner* — Ha D Ho
(74) *Attorney, Agent, or Firm* — Davis & Bujold, PLLC; Michael J. Bujold (57) ABSTRACT

A dual-clutch transmission of a countershaft design includes a main transmission and a downstream group transmission. The main transmission has a solid first transmission input shaft connected to the output of a first powershiftable clutch, a hollow second transmission input shaft connected to the output of a second powershiftable clutch/electric machine, through which the first transmission input shaft extends, and two countershafts arranged coaxially with one another. The first countershaft is a hollow shaft and the second countershaft passes through the first countershaft. A drive output shaft of the main transmission is arranged coaxially with the two transmission input shafts and is the drive input shaft of the group transmission. The drive input sides of the powershiftable clutches/machines are connected to a drive aggregate, and to bridge across the group transmission, the
(Continued)

second countershaft can be connected via a shifting element to the group transmission drive output.

11 Claims, 8 Drawing Sheets

(51) Int. Cl.
| | | |
|---|---|---|
| *B60K 6/48* | (2007.10) | |
| *B60W 10/111* | (2012.01) | |
| *B60W 10/113* | (2012.01) | |
| *F16H 3/00* | (2006.01) | |
| *F16H 3/097* | (2006.01) | |
| *F16H 3/093* | (2006.01) | |

(52) U.S. Cl.
CPC ........... *B60W 10/113* (2013.01); *F16H 3/006* (2013.01); *F16H 3/097* (2013.01); *B60K 2006/4825* (2013.01); *F16H 2003/0933* (2013.01); *F16H 2037/045* (2013.01); *F16H 2200/0078* (2013.01); *F16H 2200/0082* (2013.01); *F16H 2200/2005* (2013.01)

(58) Field of Classification Search
USPC .................................. 74/330, 331, 333, 340
See application file for complete search history.

(56) References Cited

U.S. PATENT DOCUMENTS

| | | | | |
|---|---|---|---|---|
| 8,408,084 | B2 * | 4/2013 | Gitt | ....................... F16H 37/046 |
| | | | | 74/330 |
| 9,115,789 | B2 * | 8/2015 | Lubke | ................... F16H 37/046 |
| 2008/0245167 | A1 * | 10/2008 | Gitt | ......................... F16H 3/006 |
| | | | | 74/331 |
| 2009/0272211 | A1 | 11/2009 | Hoffmann et al. | |
| 2013/0337961 | A1 * | 12/2013 | Kaltenbach | .............. B60K 6/48 |
| | | | | 475/207 |

FOREIGN PATENT DOCUMENTS

| | | |
|---|---|---|
| DE | 10 2010 041 410 A1 | 3/2012 |
| EP | 2 123 941 A1 | 11/2009 |
| WO | 2011/069526 A1 | 6/2011 |

OTHER PUBLICATIONS

Written Opinion Corresponding to PCT/EP2013/070388 mailed Apr. 10, 2014.

\* cited by examiner

|    | K1 | K2 | A | B | C | D | E | F | G | M | N | K |
|----|----|----|---|---|---|---|---|---|---|---|---|---|
| 1  | ●  |    | ● |   |   | ● |   |   |   | ● |   |   |
| 2  | ●  | ●  |   |   |   | ● | ● |   |   | ● |   |   |
| 3  | ●  |    |   | ● |   | ● |   |   |   | ● |   |   |
| 4  | ●  | ●  |   |   |   |   |   | ● |   | ● |   |   |
| 5  | ●  |    | ● |   | ● |   | ● |   |   | ● |   |   |
| 6  | ●  | ●  |   | ● | ● |   |   |   |   | ● |   |   |
| 7  | ●  |    |   |   | ● |   |   |   |   | ● |   |   |
| 8  | ●  | ●  | ● |   |   |   |   |   |   |   |   | ● |
| 9  | ●  |    |   |   |   | ● | ● |   |   |   | ● |   |
| 10 | ●  | ●  |   |   |   | ● |   |   |   |   | ● |   |
| 11 | ●  |    |   | ● |   | ● |   |   |   |   | ● |   |
| 12 | ●  | ●  | ● |   |   |   |   | ● |   |   | ● |   |
| 13 | ●  |    |   |   | ● |   | ● |   |   |   | ● |   |
| 14 | ●  | ●  |   |   | ● |   |   |   |   |   | ● |   |
| 15 | ●  |    |   | ● | ● |   |   |   |   |   | ● |   |

DUAL CLUTCH GEARBOX WITH COUNTERSHAFT DESIGN

This application is a National Stage completion of PCT/EP2013/070388 filed Oct. 1, 2013, which claims priority from German patent application serial no. 10 2012 220 063.0 filed Nov. 5, 2012.

FIELD OF THE INVENTION

The present invention concerns a dual-clutch gearbox of countershaft design.

BACKGROUND OF THE INVENTION

In essence a dual-clutch transmission consists of two sections or partial transmissions with various gearwheel pairs, two powershiftable clutches each associated with one of the partial transmissions, a drive input shaft and a drive output shaft and, depending on the number of gears, interlocking and unsynchronized shifting clutches. The gears are arranged in alternation in the two partial transmissions so that a gear can be preselected in the load-free partial transmission while the torque is being transmitted by the other partial transmission.

A gearshift is carried out by transferring the torque to be transmitted from one powershiftable clutch to the other, so that the gears can be shifted while free from load and without traction force interruption and without tensioning the shiftable gears. As a rule the odd-numbered gears can be engaged in one partial transmission and the even-numbered ones and the reverse gear in the other partial transmission.

The advantages of dual-clutch transmissions include better efficiency in comparison with transmissions of planetary design, a freer choice of gear ratios by virtue of the partial transmissions, ability to operate at high rotation speeds, and sporty driving behavior.

From the prior art dual-clutch transmissions of coaxial design are known, which comprise a main transmission and downstream therefrom a group transmission, wherein as a rule powershifts cannot be carried out which entail a group change. Disadvantageously, a non-powershifted group change takes a long time since a switchover in the group transmission and a shift in the main transmission have to be carried out, which results in a long traction force interruption.

DE 10 2005 044 068 A1 describes a powershiftable group transmission with a dual clutch, which comprises a splitter group, a direct gear, a main group and a hollow shaft arranged on a countershaft. In this case it is possible to shift, without traction force interruption, between gears produced by a change of the input constants within the splitter group of the transmission without changing the gear step in the main group. Furthermore it is possible to shift, without traction force interruption, between two adjacent gears produced by a gear ratio change within the main group. In this known transmission a power path can pass from the first individual clutch of the dual clutch, via a direct gear, to a main shaft, whereas the two forward gears immediately adjacent to the direct gear pass by way of the second individual clutch of the dual clutch and the countershaft and the hollow shaft arranged concentrically with the countershaft carries at least two gearwheels, of which one gearwheel belongs to the second input constant whereas a gearwheel adjacent to the dual clutch belongs to the first input constant. Moreover, the power path of a forward gear passes from the second individual clutch by way of the first input constant, the second input constant and the main shaft coupled in a rotationally fixed manner to a further gearwheel of the second input constant.

DE 10 2010 041 410 A1 by the present applicant describes a dual-clutch transmission comprising two clutches, whose input sides are connected to a drive input shaft and whose output sides are connected respectively to one of two transmission input shafts that are arranged coaxially with one another, with at least two countershafts arranged coaxially with one another and with a drive output shaft arranged coaxially with the drive input shaft, wherein a number of gear wheel planes are provided with which several shifting elements are associated for the engagement of loose gear wheels and/or for forming connections to shafts, in such manner that a number of forward gears can be engaged, the number of powershiftable forward gears exceeding the number of gear wheel planes by at least two.

From WO/2011/069526 a dual-clutch transmission is known, which comprises a main transmission and a group transmission connected downstream therefrom, in which, in a gear the main transmission transmits the power from an input shaft to the main shaft, while the group transmission is shifted to "low". In this case the gear is produced by means of the gear ratio of the group transmission. In the next-higher gear the group transmission is not connected into the power path and can therefore be shifted to "high", so that the transition to further, higher gears can be powershifted.

SUMMARY OF THE INVENTION

The purpose of the present invention is to indicate a dual-clutch transmission with its main transmission and a group transmission connected downstream therefrom, which demands little design effort and which has a small number of gear wheel planes, in which all the gears including the group shift can be powershifted.

According to the invention this objective is achieved by the characteristic advantages and advantageous design features emerge from the subordinate claims discussed below.

Accordingly a dual-clutch transmission of countershaft design is proposed, which comprises a main transmission and a group transmission connected downstream from the main transmission, wherein the main transmission is connected to a first transmission input shaft in the form of a solid shaft forming the drive output side of a first powershiftable clutch, which is associated with a first partial transmission, and to a second transmission input shaft in the form of a hollow shaft through which the first transmission input shaft passes and which is associated with a second partial transmission, two countershafts are arranged coaxially with one another, the first countershaft being in the form of a hollow shaft and the second countershaft passing through the first countershaft, while a drive output shaft is arranged coaxially with the two transmission input shafts, such that in the first partial transmission the odd-numbered forward gears and in the second partial transmission the even-numbered forward gears are produced, and wherein the powershiftable clutches are connected on their drive input side to a drive aggregate. In addition, the drive output shaft of the main transmission forms the drive input shaft of the group transmission, which is preferably in the form of a planetary transmission arranged coaxially with the transmission input shafts.

According to the invention, on the second transmission input shaft a first fixed gear wheel is provided, which meshes with a second fixed gear wheel on the second countershaft, whereby the first gear wheel plane of the transmission is formed, whereas on the first transmission input shaft are arranged a first loose gear wheel that can be engaged by means of a first interlocking shifting element and a second loose gear wheel that can be engaged by means of a second interlocking shifting element, these meshing respectively with a third and a fourth fixed gear wheel arranged on the first countershaft to form the second and third gear wheel planes, whereas the second engageable loose gear wheel can optionally be detachably connected either by means of the second interlocking shifting element to the first transmission input shaft or by means of a third interlock shifting element to the drive output shaft of the main transmission. Furthermore, on the drive output shaft of the main transmission there is arranged a third loose gear wheel that can be engaged by means of a fourth interlocking shifting element, which wheel meshes with a fifth fixed gear wheel arranged on the first countershaft to form the fourth gear wheel plane of the transmission. According to the invention, the first countershaft can be detachably connected in a rotationally fixed manner to the second countershaft by means of a fifth interlocking shifting element.

In addition, on the drive output shaft of the main transmission there is arranged a sixth fixed gear wheel which, to form the fifth gear wheel plane of the transmission, meshes with a fourth loose gear wheel, which is arranged on the second countershaft and can be engaged by means of a sixth interlocking shifting element.

Furthermore, to produce the reverse gear a fifth loose gear wheel, which can be engaged by means of a seventh interlocking shifting element, is arranged on the drive output shaft of the main transmission, the fifth loose gear wheel meshing with an intermediate wheel of an intermediate shaft in order to reverse the rotational direction, the intermediate wheel in turn meshing with a seventh fixed gear wheel arranged on the second countershaft, whereby the reverse-gear wheel plane is formed.

The drive output shaft of the main transmission is connected to the sun gear of the group transmission designed as a planetary transmission, whereas the drive output shaft of the group transmission is connected to the carrier of the planetary transmission. Moreover, the ring gear of the planetary transmission can be detachably connected by means of an eighth interlocking shifting element to the drive output shaft of the main transmission and hence to the sun gear of the planetary transmission, so that when the eighth shifting element is closed the planetary transmission is locked, this corresponding to the "high" setting. In addition a ninth interlocking shifting element is provided, by means of which the ring gear of the planetary transmission can be coupled detachably to the housing, this corresponding to the "low" setting. According to the invention, on the drive output shaft of the group transmission, which forms the drive output of the dual-clutch transmission, there is arranged a sixth loose gear wheel that can be engaged by means of a tenth interlocking shifting element, which gear wheel meshes with an eighth fixed gear wheel arranged on the second countershaft to form a bridging gear wheel plane, whereby the second countershaft can be detachably connected to the drive output of the group transmission.

In a further embodiment of the invention, the bridging gearwheel plane for the group transmission can be arranged before the group transmission in the force flow direction during traction operation, so that the sixth loose gear wheel is arranged on the drive output shaft of the main transmission, it can be detachably connected by means of the tenth interlocking shifting element to the carrier and hence to the drive output of the planetary transmission, and it meshes with the eighth fixed gear wheel arranged on the second countershaft. This design has the advantage that the second countershaft is made shorter so that the diameter of the ring gear of the planetary transmission does not determine the axial distance.

In this case the ring gear of the planetary transmission can be detachably connected by means of an eleventh interlocking shifting element to the carrier of the planetary transmission, so that when the eleventh shifting element is closed the planetary transmission is locked, which corresponds to the "high" setting such that the eighth interlocking shifting element is not needed. By means of the ninth interlocking shifting element, the ring gear of the planetary transmission can be detachably coupled to the housing, which corresponds to the "low" setting. In this case the ninth and the eleventh shifting elements can be combined in a dual shifting element with a common actuator. Alternatively, the eleventh and the seventh shifting elements can be combined in a dual shifting element with a common actuator, and for that purpose the carrier of the planetary transmission is extended in the form of a hollow shaft as far as the reverse-gear wheel plane. This has the advantage that the power flow when the eleventh shifting element is closed does not pass by way of the teeth of the planetary transmission, but rather, directly by way of the carrier to the drive output.

In a further embodiment of the invention, the group transmission can be in the form of a transmission of countershaft design comprising a third and a fourth countershaft. In this case, as viewed axially in the force flow direction during traction operation, after the reverse-gear wheel plane the drive output shaft of the main transmission has a seventh engageable loose gearwheel which meshes with a ninth fixed gear wheel of the fourth countershaft and with an eleventh fixed gear wheel of the third countershaft, and which can be detachably connected by means of a twelfth interlocking shifting element to the drive output shaft of the main transmission, and an eighth engageable loose gear wheel which meshes with a tenth fixed gear wheel of the fourth countershaft and a twelfth fixed gear wheel of the third countershaft, and which can be detachably connected by means of a thirteenth interlocking shifting element to the drive output shaft of the main transmission. The eighth loose gear wheel forms the drive output of the transmission. In addition, to bridge the group transmission the third countershaft, and hence also the drive output of the transmission, can be detachably connected by means of a fourteenth interlocking shifting element to the second countershaft. In this example embodiment the eighth, ninth, tenth and eleventh shifting elements are not needed.

In advantageous further developments of the invention, starting from the embodiments described the transmission according to the invention can be hybridized, and for that purpose one of the transmission input shafts, preferably the second transmission input shaft, is connected to an electric machine, so that the powershift clutch associated with the transmission input shaft can be omitted and the drive output side of the powershift clutch of the other transmission input shaft can be connected by means of a further interlocking shifting element to the transmission input shaft connected to the electric machine.

The dual-clutch transmission of countershaft design according to the invention comprises a total of fifteen forward gears and six reverse gears, all the gears being powershiftable since the group transmission is bridged.

BRIEF DESCRIPTION OF THE DRAWINGS

Below, examples of the invention are explained in greater detail with reference to the attached figures, which show.

DETAILED DESCRIPTION OF THE PREFERRED EMBODIMENTS

The structure of dual-clutch transmissions of countershaft design is already well known to those with knowledge of the subject, so that in the figure descriptions only the components relevant to the invention will be described and explained in detail. The same indexes are used for the same components.

Figure 1:
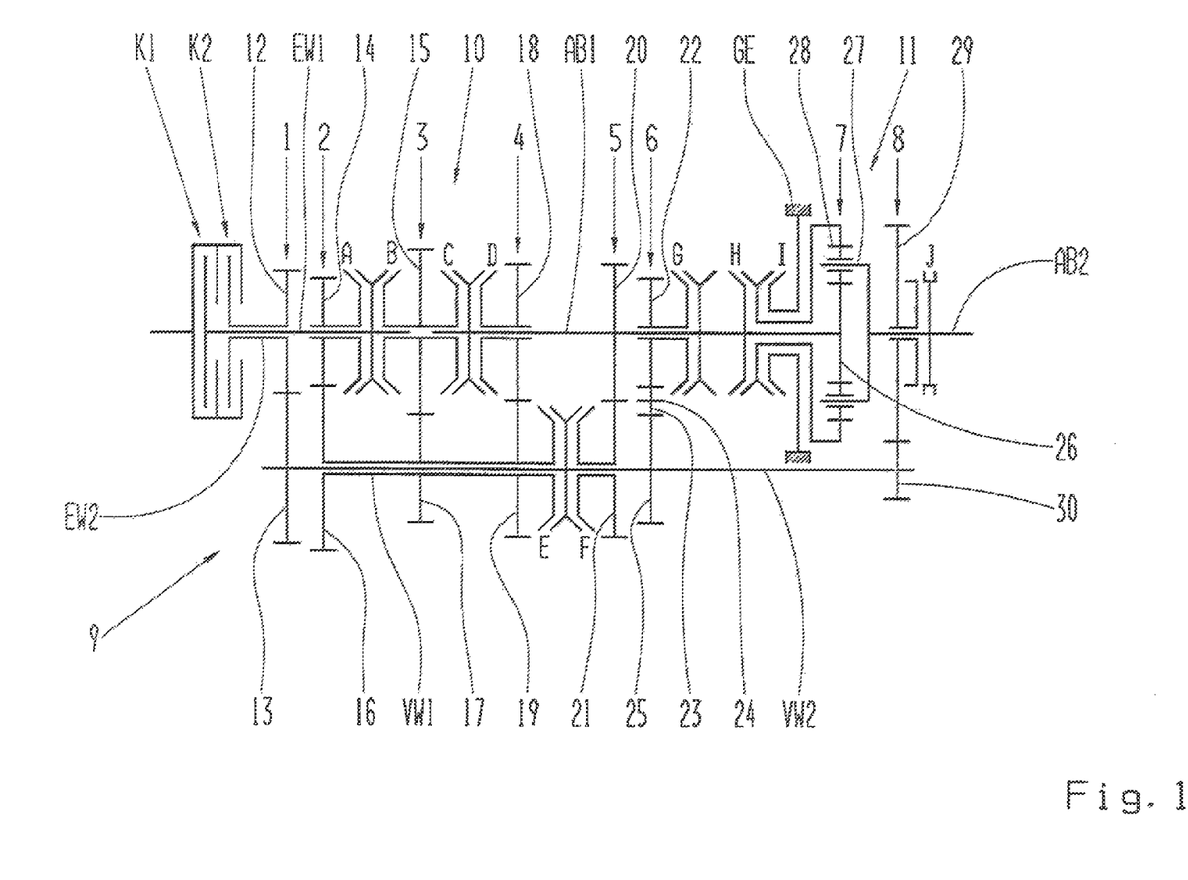
FIG. 1: A schematic representation of a first embodiment of a dual-clutch transmission according to the invention, with a main transmission and a downstream group transmission.

FIG. 1 shows a dual-clutch transmission 9 of countershaft design, comprising a main transmission 10 and a group transmission 11 connected downstream from the main transmission 10, wherein the main transmission 10 comprises a first transmission input shaft EW1 in the form of a solid shaft connected to the drive output side of a first powershiftable clutch K1 which is associated with a first partial transmission, and a second transmission input shaft EW2 in the form of a hollow shaft connected to the drive output side of a second powershiftable clutch K2, through which shaft the first transmission input shaft EW1 passes, and which is associated with a second partial transmission, two countershafts VW1, VW2 arranged coaxially with one another, the first countershaft VW1 being made as a hollow shaft and the second countershaft VW2 passing through the first countershaft VW1, and a drive output shaft AB1 arranged coaxially with the two transmission input shafts EW1, EW2, such that in the first partial transmission the odd-numbered forward gears and in the second partial transmission the even-numbered forward gears are produced, and wherein the powershiftable clutches K1, K2 are connected on their drive input side with a drive aggregate. As can be seen from FIG. 1, the drive output shaft AB1 of the main transmission 10 forms the drive input shaft of the group transmission 11, which in the example shown is in the form of a planetary transmission arranged coaxially with the transmission shafts EW1, EW2.

According to the invention and referring to FIG. 1, on the second transmission input shaft EW2 there is provided a first fixed gear wheel 12 which meshes with a second fixed gear wheel 13 on the second countershaft VW2 to form the first gear wheel plane 1 of the transmission 9, whereas arranged on the first transmission input shaft EW1 is a first loose gear wheel 14 that can be engaged by means of a first interlocking shifting element A and a second loose gear wheel 15 that can be engaged by means of a second interlocking shifting element B, these—in order to form the second and third gear wheel planes 2, 3 of the transmission—meshing respectively with third 16 and fourth 17 fixed gear wheels, which are arranged on the first countershaft VW1 In this case the second engageable loose gear wheel 15 can optionally be detachably connected to the first transmission input shaft EW1 in a rotationally fixed manner by means of the second interlocking shifting element B or by means of a third interlocking shifting element C to the drive output shaft AB1 of the main transmission 10.

As can be seen from FIG. 1, on the drive output shaft AB1 of the main transmission 10 there is arranged a third loose gear wheel 18 that can be engaged by means of a fourth interlocking shifting element D, this gear wheel 18 meshing with a fifth fixed gear wheel 19 on the first countershaft VW1 to form the fourth gear wheel plane 4 of the transmission. According to the invention, the first countershaft VW1 can be detachably connected in a rotationally fixed manner to the second countershaft VW2 by means of a fifth interlocking shifting element E.

Referring to FIG. 1, on the drive output shaft AB1 of the main transmission 10 there is arranged a sixth fixed gear wheel 20 which, to form the fifth gear wheel plane 5 of the transmission 9, meshes with a fourth loose gear wheel 21 which is arranged on the second countershaft VW2 and can be engaged thereto by means of a sixth interlocking shifting element F.

To produce the reverse gears, on the drive output shaft AB1 of the main transmission 10 there is arranged a fifth loose gear wheel 22 which can be engaged by means of a seventh interlocking shifting element G and which meshes with an intermediate gear wheel 23 of an intermediate shaft 24 in order to reverse the rotational direction, the gear wheel 23 in turn meshing with a seventh fixed gear wheel 25 arranged on the second countershaft VW2 so that the sixth, reverse-gear wheel plane 6 is formed.

Furthermore the drive output shaft AB1 of the main transmission 10 is connected to the sun gear 26 of the group transmission 11 made as a planetary transmission, whereas the drive output shaft AB2 of the group transmission 11 is connected to the carrier 27 of the planetary transmission. The ring gear 28 of the planetary transmission can be detachably connected by means of an eighth interlocking shifting element H to the drive output shaft AB1 of the main transmission 9 and hence to the sun gear 26 of the planetary transmission; when the eighth shifting element H is closed the planetary transmission is locked, which corresponds to the "high" setting. According to the invention a ninth interlocking shifting element I is provided, by means of which the ring gear 28 of the planetary transmission can be detachably coupled to the housing GE, this corresponding to the "low" setting, whereas on the drive output shaft AB2 of the group transmission 11, which forms the drive output of the dual-clutch transmission, there is arranged a sixth loose gear wheel 29 which can be engaged by means of a tenth interlocking shifting element J and which, to form a bridging gear wheel plane 8 for the group transmission 11, meshes with an eighth fixed gear wheel 30 arranged on the second countershaft VW2. In the figure the seventh gear wheel plane of the transmission 9 is indexed 7.

In the example shown, the first and second shifting elements A, B, the third and fourth shifting elements C, D, the fifth and sixth shifting elements E, F and the eighth and ninth shifting elements H, I are in each case combined in a dual shifting element having a common actuator.

Figure 2:
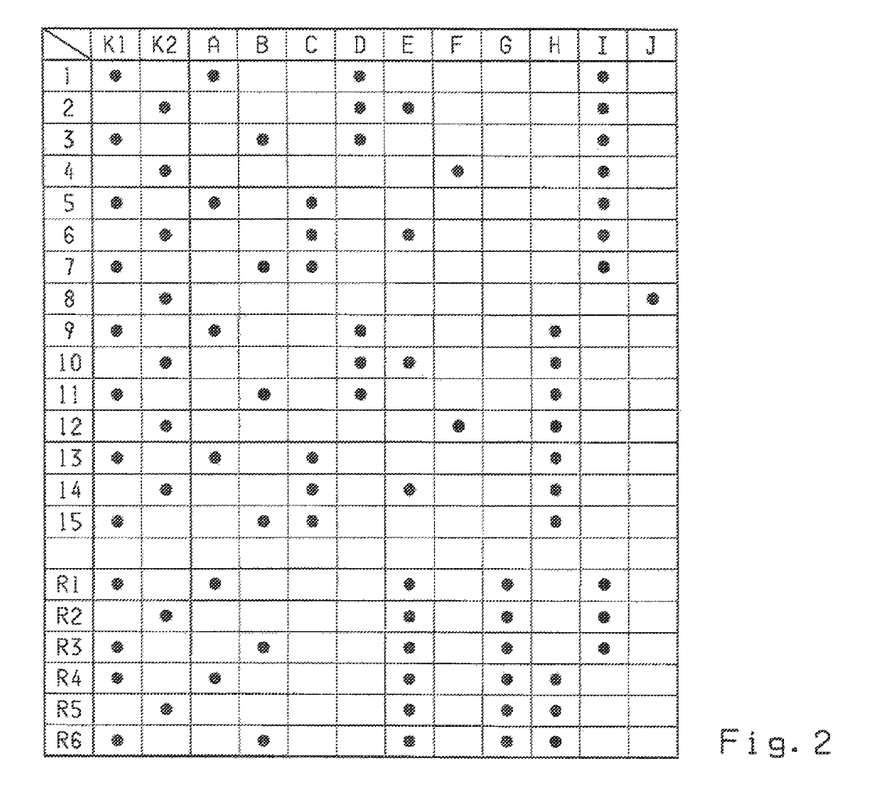
FIG. 2: An example shifting scheme for a dual-clutch transmission according to FIG. 1.

Referring to the shifting scheme shown in FIG. 2, in the transmission 9 shown in FIG. 1 the first forward gear is engaged by switching to the first powershift clutch K1, i.e. with the first transmission input shaft EW1 connected into the force flow, and the first, fourth and ninth shifting elements A, D and I are closed. The second forward gear is obtained by closing the second powershift clutch K2 and the fourth, fifth and ninth shifting elements D, E, I, the third forward gear by closing the first powershift clutch K1 and the second, fourth and ninth shifting elements B, D, I, the fourth forward gear by closing the second powershift clutch K2 and the sixth, and ninth shifting elements F, I, the fifth forward gear by closing the first powershift clutch K1 and the first, third and ninth shifting elements A, C, I, the sixth forward gear by closing the second powershift clutch K2 and the third, fifth and ninth shifting elements C, E, I, whereas the seventh forward gear is obtained by closing the first powershift clutch K1 and the second, third and ninth shifting elements B, C, I. Accordingly, in the seventh forward gear the power is transmitted from the first input shaft EW1 directly to the drive output shaft AB1 of the main transmission 10, whereby the transmission ratio of the seventh forward gear corresponds to the transmission ratio of the group transmission 11 in the "low" position.

According to the invention the eighth forward gear, which serves as a supporting gear, is obtained by closing the second powershift clutch K2 and the tenth shifting element J, whereby the group transmission 11 is bridged and is no longer in the power flow, so that by closing the eighth shifting element H a shift to "high" can be carried out; thereafter the remaining forward gears 9 to 15 can be engaged.

The forward gears 9 to 15 are engaged analogously to the forward gears 1 to 7, but instead of the ninth shifting element I, the eighth shifting element H is closed.

Referring to FIG. 2, the first reverse gear is obtained by closing the first powershift clutch K1 and the first, fifth, seventh and ninth shifting elements A, E, G, I, the second reverse gear by closing the second powershift clutch K2 and the fifth, seventh and ninth shifting elements E, G, I, the third reverse gear by closing the first powershift clutch K1 and the second, fifth, seventh and ninth shifting elements B, E, G, I, whereas the reverse gears 4 to 6 are obtained analogously to the reverse gears 1 to 3, with the difference that the group transmission 11 is shifted to "high", so that instead of the ninth shifting element I the eight shifting element H is closed.

This provides a dual-clutch transmission with a group transmission, which has fifteen powershiftable forward gears including the eighth forward gear that serves as a supporting gear.

Figure 3:
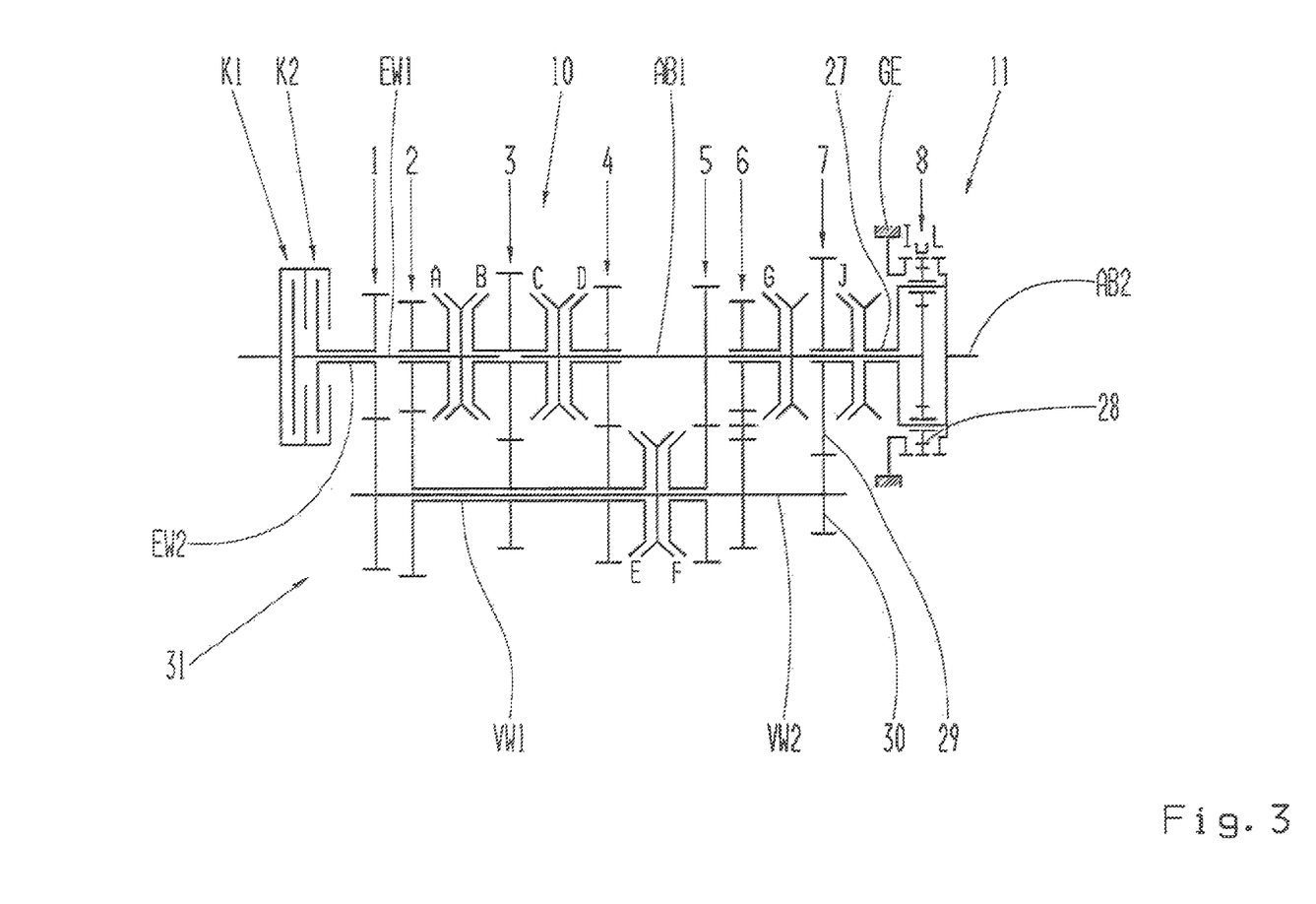
FIG. 3: A schematic representation of a second embodiment of a dual-clutch transmission according to the invention, with a main transmission and a downstream group transmission.

The transmission 31 shown in FIG. 3 differs from the example embodiment of FIG. 1 in that the bridging gear wheel plane for the group transmission 11 is arranged before the group transmission 11 in the force flow direction during traction operation, and forms the seventh gear wheel plane 7 of the transmission 31, whereas the sixth gear loose wheel 29 is arranged on the drive output shaft AB1 of the main transmission 10, it can be detachably connected by means of the tenth interlocking shifting element J to the carrier 27 and hence to the drive output AB2 of the group transmission 11 in the form of a planetary transmission, and it meshes with the eighth fixed gear wheel 30 arranged on the second countershaft VW2. This design has the advantage that the second countershaft VW2 is shorter than in the example embodiment according to FIG. 1, so that the ring gear diameter of the planetary transmission does not determine the axial distance.

In this case the ring gear 28 of the planetary transmission can be detachably connected by means of an eleventh interlocking shifting element L to the carrier 27 of the planetary transmission, so that when the eleventh shifting element L is closed the planetary transmission is blocked, this corresponding to the "high" setting so that the eighth interlocking shifting element H shown in FIG. 1 can be omitted. By means of the ninth interlocking shifting element I, the ring gear 28 of the planetary transmission can be detachably coupled to the housing GE, which corresponds to the "low" setting. Advantageously, the ninth and eleventh shifting elements I, L can be combined as a dual shifting element with a common actuator. In addition, in the example shown the first and second shifting elements A, B, the third and fourth shifting elements C, D and the fifth and sixth shifting elements E, F can in each case also be combined as dual shifting elements with common actuators.

Alternatively, starting from the example embodiment according to FIG. 3 the eleventh and seventh shifting elements L, G can be combined as a dual shifting element with a common actuator, and for that purpose the carrier 27 of the planetary transmission is elongated as far as the reverse-gear wheel plane, this producing the advantage that when the eleventh shifting element L is closed, the power flow does not pass by way of the teeth of the planetary transmission, but rather, directly via the carrier to the drive output AB2. This embodiment is illustrated with reference to FIG. 4.

Figure 4:
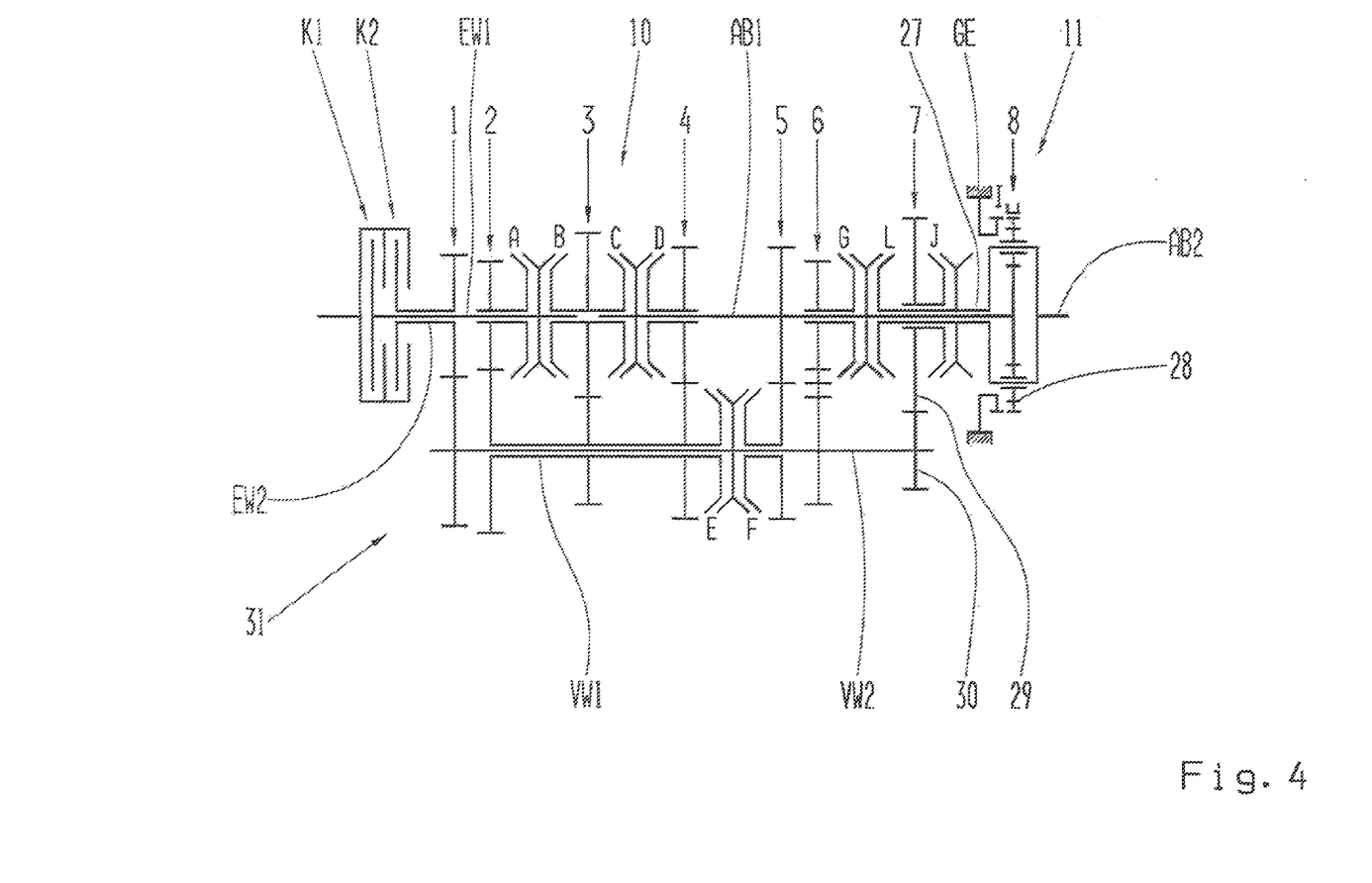
FIG. 4: A schematic representation of a third embodiment of a dual-clutch transmission according to the invention, with a main transmission and a downstream group transmission.
Figure 5:
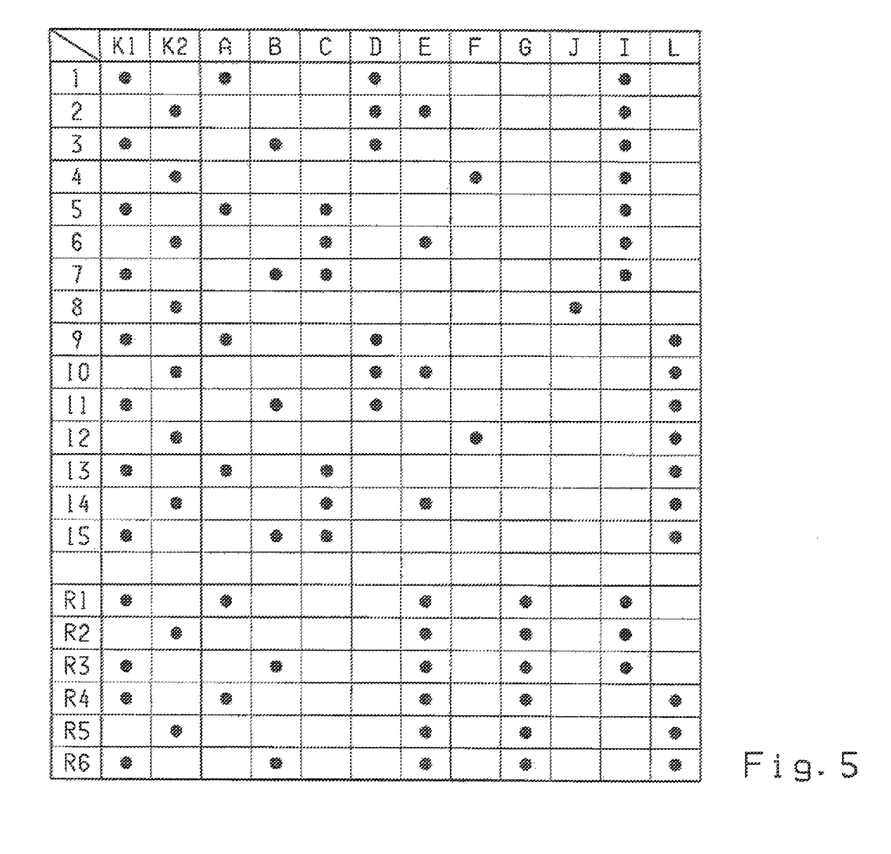
FIG. 5: An example shifting scheme for a dual-clutch transmission according to FIGS. 3 and 4.

An example shifting scheme for the transmissions shown in FIGS. 3 and 4 is the object of FIG. 5. This shifting scheme differs from the shifting scheme according to FIG. 2 in that the eighth shifting element H is replaced by the eleventh shifting element L for shifting the group transmission 11 to "high".

Figure 6:
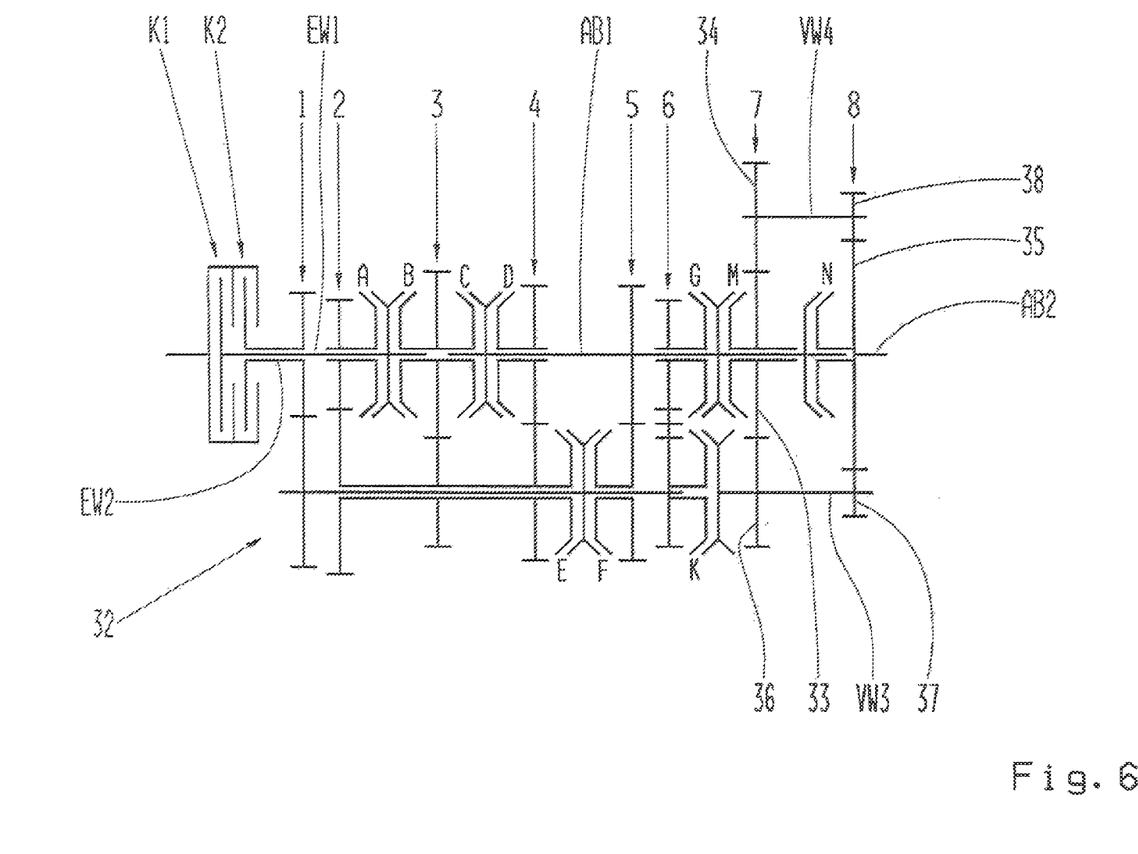
FIG. 6: A schematic representation of a fourth embodiment of a dual-clutch transmission according to the invention, with a main transmission and a downstream group transmission.

The object of FIG. 6 is a transmission 32 in which the group transmission 11 is designed as a transmission of countershaft structure comprising third and fourth countershafts VW3, VW4, wherein the structure of the main transmission 10 corresponds to its structure according to FIGS. 1, 3 and 4. In this case, as viewed axially in the force flow direction during traction operation, the drive output shaft AB1 of the main transmission has a seventh engageable loose gear wheel 33 after the reverse-gear wheel plane 6, which meshes with a ninth fixed gear wheel 34 of the fourth countershaft VW4 and with an eleventh fixed gear wheel 36 of the third countershaft VW3 and which can be detachably connected by means of a twelfth interlocking shifting element M to the drive output shaft AB1 of the main transmission, and an eighth loose gear wheel 35 which meshes with a tenth fixed gear wheel 37 of the fourth countershaft VW4 and with a twelfth fixed gear wheel 38 of the third countershaft VW3, and which can be detachably connected by means of a thirteenth interlocking shifting element N to the drive output shaft AB1 of the main transmission 10. The eighth loose gear wheel 35 forms the drive output AB2 of the transmission. Moreover, the third countershaft VW3 can be detachably connected by means of a fourteenth interlocking shifting element K to the second countershaft VW2.

Figure 7:
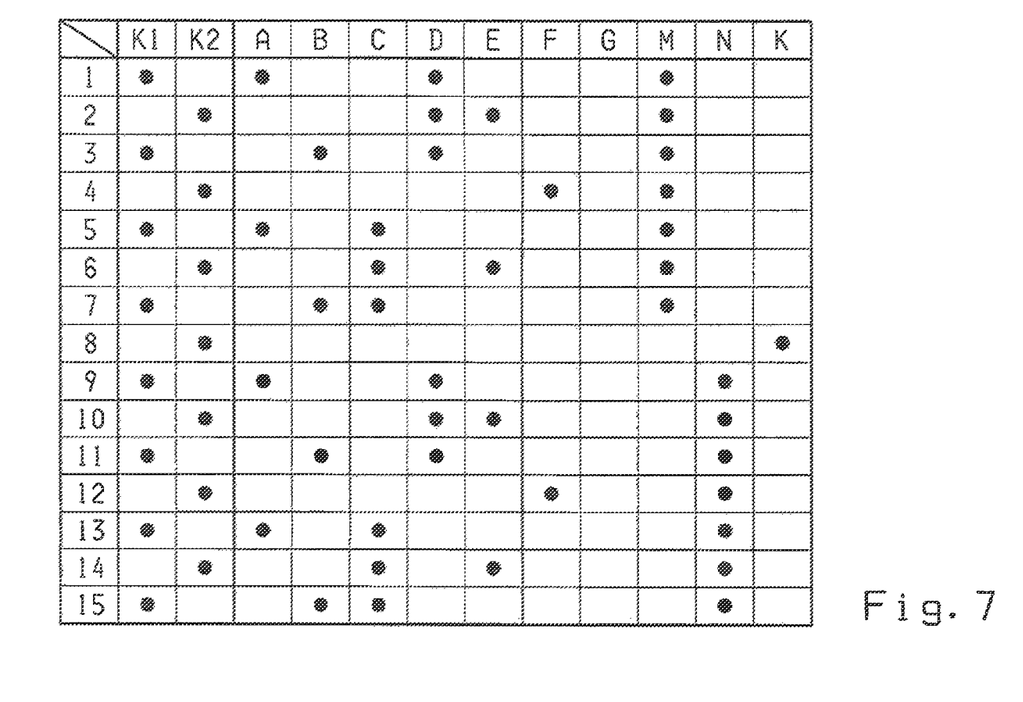
FIG. 7: An example shifting scheme for a dual-clutch transmission according to FIG. 6.

In this embodiment, the group transmission 11 is bridged when the second powershift clutch and the fourteenth shifting element K are both closed. By closing the twelfth shifting element M the group transmission is shifted to "low", whereas a shift to "high" is brought about by closing the thirteenth shifting element N. An example shifting scheme for the forward gears is shown in FIG. 7. The shifting scheme differs from the one in FIG. 2 in that the eighth shifting element H for shifting the group transmission 11 to "high" is replaced by the thirteenth shifting element N, the ninth shifting element I for shifting the group transmission 11 to "low" is replaced by the twelfth shifting element M, and the tenth shifting element J is replaced by the fourteenth shifting element K. The six reverse gears are engaged analogously to the shifting scheme according to FIG. 2, but with the eighth shifting element H replaced by the thirteenth shifting element N and the ninth shifting element I replaced by the twelfth shifting element M.

Figure 8:
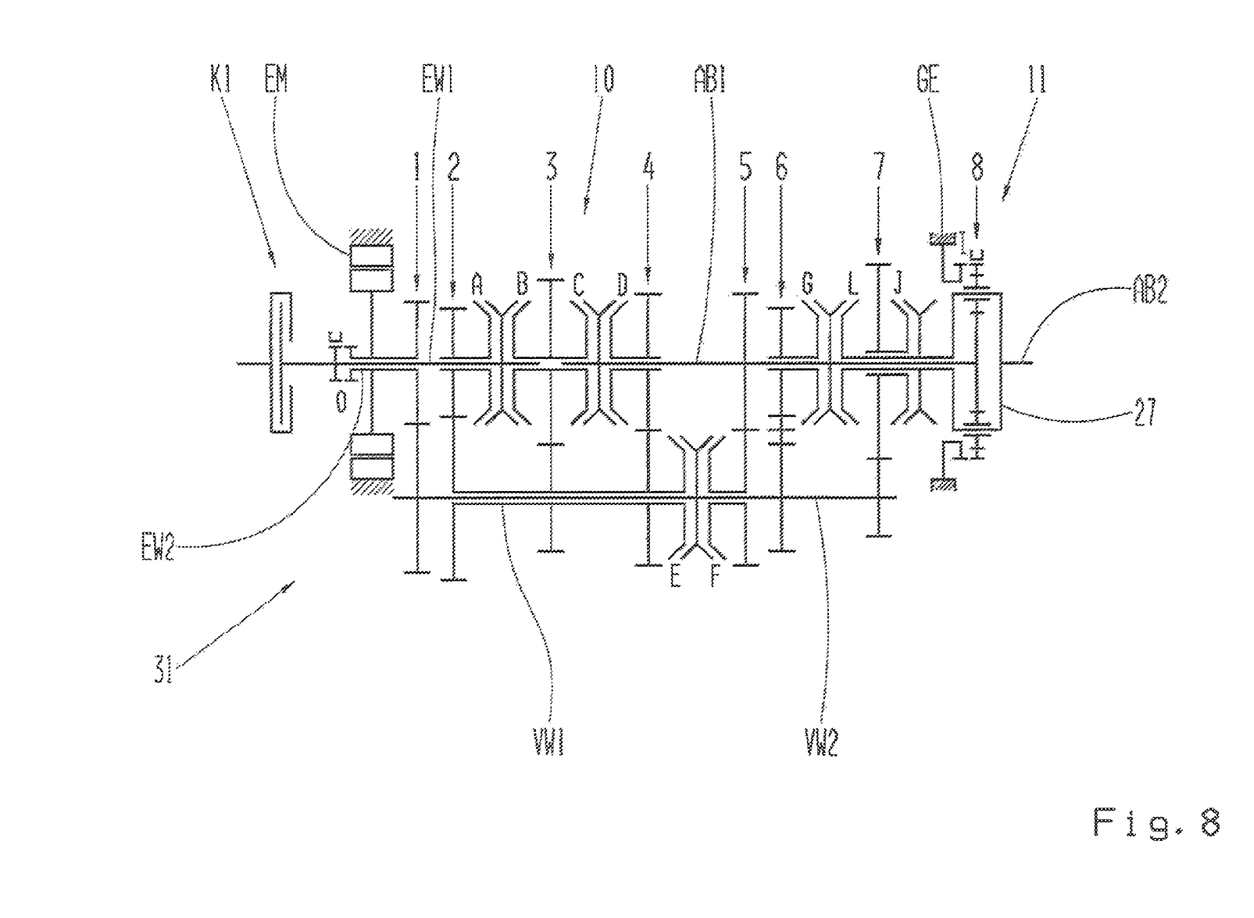
FIG. 8: A schematic representation of a fifth embodiment of a dual-clutch transmission according to the invention, with a main transmission and a downstream group transmission.

Starting with the embodiments described, the transmission according to the invention can be hybridized, which will be explained with reference to FIG. 8 which shows a transmission 31 according to FIG. 4 in hybridized form. In this case the second transmission input shaft EW2 is connected to an electric machine EM, so that the powershift clutch associated with the second transmission input shaft EW2 is no longer needed and the drive output side of the powershift clutch K1 of the first transmission input shaft EW1 can be connected by means of a further interlocking shifting element O to the second transmission input shaft EW2, itself connected to the electric machine EM.

INDEXES

1 First gear wheel plane of the transmission
2 Second gear wheel plane of the transmission
3 Third gear wheel plane of the transmission
4 Fourth gear wheel plane of the transmission
5 Fifth gear wheel plane of the transmission
6 Sixth gear wheel plane of the transmission
7 Seventh gear wheel plane of the transmission
8 Eighth gear wheel plane of the transmission
9 Transmission
10 Main transmission
11 Group transmission
12 First fixed gear wheel
13 Second fixed gear wheel
14 First loose gear wheel
15 Second loose gear wheel
16 Third fixed gear wheel
17 Fourth fixed gear wheel
18 Third loose gear wheel
19 Fifth fixed gear wheel
20 Sixth fixed gear wheel
21 Fourth loose gear wheel
22 Fifth loose gear wheel
23 Intermediate wheel
24 Intermediate shaft
25 Seventh fixed gear wheel
26 Sun gear
27 Carrier
28 Ring gear
29 Sixth loose gear wheel
30 Eighth fixed gear wheel
31 Transmission
32 Transmission
33 Seventh loose gear wheel
34 Ninth fixed gear wheel
35 Eighth loose gear wheel
36 Eleventh fixed gear wheel
37 Tenth fixed gear wheel
38 Twelfth fixed gear wheel
K1 First powershift clutch
K2 Second powershift clutch
A First shifting element
B Second shifting element
C Third shifting element
D Fourth shifting element
E Fifth shifting element
F Sixth shifting element
G Seventh shifting element
H Eighth shifting element
I Ninth shifting element
J Tenth shifting element
L Eleventh shifting element
M Twelfth shifting element
N Thirteenth shifting element
K Fourteenth shifting element
O Further shifting element
GE Housing
EM Electric machine
EW1 First transmission input shaft
EW2 Second transmission input shaft
VW1 First countershaft
VW2 Second countershaft
VW3 Third countershaft
VW4 Fourth countershaft

The invention claimed is:
1. A dual-clutch transmission (9, 31, 32) of a countershaft design, the dual-clutch transmission comprising:
a main transmission (10) and a group transmission (11) being connected downstream from the main transmission (10);
the main transmission (10) comprising a first transmission input shaft (EW1) in a form of a solid shaft that is connected to a drive output side of a first powershift clutch (K1), a second transmission input shaft (EW2) in a form of a hollow shaft that is connected to a drive output side of a second powershift clutch (K2) and through which the first transmission input shaft (EW1) passes;
first and second countershafts (VW1, VW2) being arranged coaxially with one another, the first countershaft (VW1) being a hollow shaft and the second countershaft (VW2) passing through the first countershaft (VW1);
a drive output shaft (AB1) of the main transmission (10) being arranged coaxially with the first and the second transmission input shafts (EW1, EW2) and forming a drive input shaft of the group transmission (11);
drive input sides of the first and the second powershift clutches (K1, K2) are connected to a drive aggregate;
a first fixed gear wheel (12) being arranged on the second transmission input shaft (EW2) and meshing with a second fixed gear wheel (13) on the second countershaft (VW2);
a first loose gear wheel (14) being engagable by a first interlocking shifting element (A) and a second loose gear wheel (15) being engagable by a second interlocking shifting element (B), and both the first and the second loose gear wheels (14, 15) being arranged on the first transmission input shaft (EW1);
each of the first and the second loose gear wheels meshing with a respective one of a third (16) and a fourth (17) fixed gear wheel on the first countershaft (VW1);

the second engagable loose gear wheel (15) being either detachably connectable in a rotationally fixed manner, via the second interlocking shifting element (B), to the first transmission input shaft (EW1) or, via a third interlocking shifting element (C), to the drive output shaft (AB1) of the main transmission (10);

a third loose gear wheel (18), arranged on the drive output shaft (AB1) of the main transmission (10), meshing with a fifth fixed gear wheel (19) arranged on the first countershaft (VW1), and the third loose gear wheel (18) being engagable by a fourth interlocking shifting element (D);

the first countershaft (VW1) being detachably engagable, via a fifth interlocking shifting element (E), with the second countershaft (VW2) in a rotationally fixed manner;

a sixth fixed gear wheel (20) being arranged on the drive output shaft (AB1) of the main transmission (10) and meshing with a fourth loose gear wheel (21) arranged on the second countershaft (VW2), and the fourth loose gearwheel (21) being engagable by a sixth interlocking shifting element (F);

a fifth loose gear wheel (22), arranged on the drive output shaft (AB1) of the main transmission (10), being engagable by a seventh interlocking shifting element (G) and meshing with an intermediate gear wheel (23) of an intermediate shaft (24) meshing with a seventh fixed gear wheel (25) arranged on the second countershaft (VW2) to reverse a rotational direction and produce reverse gears and form a reverse-gear wheel plane (6); and the second countershaft (VW2) being detachably connectable to a drive output (AB2) of the group transmission (11) by an eighth shifting element (J, K) to bridge the group transmission (11).

2. The dual-clutch transmission (9) of the countershaft design according to claim 1, wherein the group transmission (11) is a planetary transmission, the drive output shaft (AB1) of the main transmission (10) is connected to a sun gear (26) of the planetary transmission and the drive output (AB2) of the group transmission (11) is connected to a carrier (27) of the planetary transmission, and a ring gear (28) of the planetary transmission is detachably connectable, via a tenth interlocking shifting element (H), to the drive output shaft (AB1) of the main transmission (10), a ninth interlocking shifting element (I) detachably couples the ring gear (28) of the planetary transmission to a housing (GE), a sixth loose gear wheel (29) is arranged on the drive output (AB2) of the group transmission (11) and is engagable by the eighth interlocking shifting element (J), and the sixth loose gear wheel meshes with an eighth fixed gear wheel (30) that is arranged on the second countershaft (VW2).

3. The dual-clutch transmission (9) of the countershaft design according to claim 2, wherein each pair of the first and the second interlocking shifting elements (A, B), the third and the fourth interlocking shifting elements (C, D), the fifth and the sixth interlocking shifting elements (E, F) and the ninth and the tenth interlocking shifting elements (I, H) are combined as dual shifting elements and respectively have a common actuator.

4. The dual-clutch transmission (31) of the countershaft design according to claim 1, wherein the group transmission (11) is a planetary transmission, the drive output shaft (AB1) of the main transmission (10) is connected to a sun gear (26) of the planetary transmission and the drive output shaft (AB2) of the group transmission (11) is connected to a carrier (27) of the planetary transmission, a sixth loose gear wheel (29) is arranged on the drive output shaft (AB1) of the main transmission (10) and is detachably connectable, via the eighth interlocking shifting element (J), to a carrier (27) of the planetary transmission and meshes with an eighth fixed gear wheel (30) arranged on the second countershaft (VW2), the ring gear (28) of the planetary transmission is detachably connectable by a tenth interlocking shifting element (L) to the carrier (27) of the planetary transmission, and the ring gear (28) of the planetary transmission is detachably couplable to a housing (GE) by a ninth interlocking shifting element (I).

5. The dual-clutch transmission (31) of the countershaft design according to claim 4, wherein each pair of the first and the second shifting interlocking elements (A, B), the third and the fourth interlocking shifting elements (C, D), the fifth and the sixth interlocking shifting elements (E, F) and the ninth and the tenth interlocking shifting elements (G, L, M) is combined as a dual shifting element and respectively has a common actuator.

6. The dual-clutch transmission (31) of the countershaft design according to claim 4, wherein each pair of the first and the second interlocking shifting elements (A, B), the third and the fourth shifting elements (C, D), the fifth and the sixth shifting elements (E, F) and the tenth and the seventh shifting elements (L, G) is combined as a dual shifting element and respectively has a common actuator, the carrier (27) of the planetary transmission extends in a form of a hollow shaft as far as the reverse-gear wheel plane (6), and power flow when the tenth shifting element (L) is engaged, passes directly via the carrier (27) of the planetary transmission, and not via teeth of the planetary transmission, to the drive output (AB2) of the transmission (31).

7. The dual-clutch transmission (32) of the countershaft design according to claim 1, wherein the group transmission (11) is a transmission of countershaft design which comprises a third and a fourth countershaft (VW3, VW4), the drive output shaft (AB1) of the main transmission (10), as viewed axially in a force flow direction during traction operation, comprises a sixth engageable loose gear wheel (33), after the reverse-gear wheel plane (6), which meshes with a eight fixed gear wheel (34) of the fourth countershaft (VW4) and with a tenth fixed gear wheel (36) of the third countershaft (VW3) and is detachably connectable, via a tenth interlocking shifting element (M), to the drive output shaft (AB1) of the main transmission (10), and also comprises a seventh engageable loose gear wheel (35), which meshes with a ninth fixed gear wheel (37) of the fourth countershaft (VW4) and with an eleventh fixed gear wheel (38) of the third countershaft (VW3) and is detachably connectable, via a ninth interlocking shifting element (N), to the drive output shaft (AB1) of the main transmission (10), the seventh loose gear wheel (35) forms the drive output (AB2) of the transmission (32) and the third countershaft (VW3) is detachably connectable, via the eight interlocking shifting element (K), to the second countershaft (VW2).

8. The dual-clutch transmission (9, 31, 32) of the countershaft design according to claim 1, wherein the first and the second powershift clutches, the first, the second, the third, the fourth, the fifth, the sixth, the seventh, the eighth, and ninth and tenth interlocking shifting elements are selectively engagable to implement first, second, third, fourth, fifth, sixth, seventh, eighth, ninth, tenth, eleventh, twelfth, thirteenth, fourteenth and fifteenth powershiftable forward gears and first, second, third, fourth, fifth, and sixth powershiftable reverse gears, the first forward gear is implemented by engaging the first powershiftable clutch (K1) and the first, the fourth and the ninth shifting elements (A, D, I, N), the second forward gear is implemented by engaging the second powershiftable clutch (K2) and the fourth, the fifth and the ninth shifting elements (D, E, I, N), the third forward gear is implemented by engaging the first powershiftable clutch (K1) and the second, the fourth and the ninth shifting elements (B, D, I, N), the fourth forward gear is implemented by engaging the second powershiftable clutch (K2) and the sixth and the ninth shifting elements (F, I, N), the fifth forward gear is implemented by engaging the first powershiftable clutch (K1) and the first, the third and the ninth shifting elements (A, C, I, N), the sixth forward gear is implemented by engaging the second powershiftable clutch (K2) and the third, the fifth and the ninth shifting elements (C, E, I, N), the seventh forward gear is implemented by engaging the first powershiftable clutch (K1) and the second, the third and the ninth shifting elements (B, C, I, N), the eighth forward gear is a supporting gear and is implemented by engaging the second powershiftable clutch (K2) and the eighth shifting element (J, K), such that power flow in the group transmission (11), being bridged, is interrupted and by engaging the tenth shifting element (H, L, M) the group transmission (11) is switched to "high", and the ninth forward gear is implemented by engaging the first powershiftable clutch (K1) and the first, the fourth and the tenth shifting elements (A, D, H, L, M), the tenth forward gear is implemented by engaging the second powershiftable clutch (K2) and the fourth, the fifth and the tenth shifting elements (D, E, H, L, M), the eleventh forward gear is implemented by engaging the first powershiftable clutch (K1) and the second, the fourth and the tenth shifting elements (B, D, H, L, M), the twelfth forward gear is implemented by engaging the second powershiftable clutch (K2) and the sixth and the tenth shifting elements (F, H, L, M H), the thirteenth forward gear is implemented by engaging the first powershiftable clutch (K1) and the first, the third and the tenth shifting elements (A, C, H, L, M), the fourteenth forward gear is implemented by engaging the second powershiftable clutch (K2) and the third, the fifth and the tenth shifting elements (C, E, H, L, M), the fifteenth forward gear is implemented by engaging the first powershiftable clutch (K1) and the second, the third and the tenth shifting elements (B, C, H, L, M), the first reverse gear is implemented by engaging the first powershiftable clutch (K1) and the first, the fifth, the seventh and the ninth shifting elements (A, E, G, I, N), the second reverse gear is implemented by engaging the second powershiftable clutch (K2) and the fifth, the seventh and the ninth shifting elements (E, G, I, N), the third reverse gear is implemented by engaging the first powershiftable clutch (K1) and the second, the fifth, the seventh and the ninth shifting elements (B, E, G, I, N), the fourth reverse gear is implemented by engaging the first powershiftable clutch (K1) and the first, the fifth, the seventh and the tenth shifting elements (A, E, G, H)

the fifth reverse gear is implemented by engaging the second powershiftable clutch (K2) and the fifth, the seventh and the tenth shifting elements (E, G, H, L, M), and the sixth reverse gear is implemented by engaging the first powershiftable clutch (K1) and the second, the fifth, the seventh and the tenth shifting elements (B, E, G, H, L, M).

9. The dual-clutch transmission (9, 31, 32) of the countershaft design according to claim 1, wherein one of the first and the second transmission input shafts (EW1, EW2) is connected to an electric machine (EM).

10. A dual-clutch transmission (9, 31, 32) of a countershaft design, the dual-clutch transmission comprising a main transmission (10) and a group transmission (11) connected downstream from the main transmission (10), wherein the main transmission (10) comprises a first transmission input shaft (EW1) in the form of a solid shaft connected to the drive output side of a first powershift clutch (K1), a second transmission input shaft (EW2) in the form of a hollow shaft surrounding the first transmission input shaft (EW1) and connected to the drive output side of a second powershift clutch (K2), two countershafts (VW1, VW2) arranged coaxially with one another, the first countershaft (VW1) being a hollow shaft and the second countershaft (VW2) passing through the first countershaft (VW1), a drive output shaft (AB1) arranged coaxially with the first and the second transmission input shafts (EW1, EW2), which forms the drive input shaft of the group transmission (11), wherein the powershift clutches (K1, K2) are connected on their drive input side to a drive aggregate, a first fixed gear wheel (12) is arranged on the second transmission input shaft (EW2), which gear wheel meshes with a second fixed gear wheel (13) on the second countershaft (VW2), on the transmission input shaft (EW1) there are arranged a first loose gear wheel (14) which can be engaged by means of a first interlocking shifting element (A) and a second loose gear wheel (15) which can be engaged by means of a second interlocking shifting element (B), each of the first and the second loose gear wheels (14, 15) respectively meshing with a third (16) and a fourth (17) fixed gear wheel on the first countershaft (VW1), the second engagable loose gear wheel (15) be is detachably connected, in a rotationally fixed manner, by means of the second interlocking shifting element (B) to the first transmission input shaft (EW1) or by means of a third interlocking shifting element (C) to the drive output shaft (AB1) of the main transmission (10), on the drive output shaft (AB1) of the main transmission (10) there is arranged a third loose gear wheel (18) that can be engaged by means of a fourth interlock shifting element (D) which meshes with a fifth fixed gear wheel (19) arranged on the first countershaft (VW1), by means of a fifth interlocking shifting element (E), the first countershaft (VW1) can be detachably connected in a rotationally fixed manner to the second countershaft (VW2), on the drive output shaft (AB1) of the main transmission (10) there is arranged a sixth fixed gear wheel (20), which meshes with a fourth loose gear wheel (21) that is arranged on the second countershaft (VW2) and can be engaged by means of a sixth interlocking shifting element (F), to produce the reverse gears and to form the reverse-gear wheel plane (6) there is arranged on the drive output shaft (AB1) of the main transmission (10) a fifth loose gear wheel (22) that can be engaged by means of a seventh interlocking shifting element (G), which gear wheel meshes with an intermediate gear wheel (23) of an intermediate shaft (24) that meshes with a seventh fixed gear wheel (25) arranged on the second countershaft (VW2) in order to reverse the rotational direction, and to bridge the group transmission (11), the second countershaft (VW2) can be detachably connected to the drive output (AB2) of the group transmission (11) by means of an eighth shifting element (J, K).

11. A dual-clutch transmission (9, 31, 32) of a countershaft design, the dual-clutch transmission comprising:

a main transmission (10) and a group transmission (11) being connected downstream from the main transmission (10);

the main transmission (10) comprising a first transmission input shaft (EW1) in a form of a solid shaft that is connected to a drive output side of a first powershift clutch (K1), a second transmission input shaft (EW2) in a form of a hollow shaft that is connected to a drive output side of an electric machine (EM) and through which the first transmission input shaft (EW1) passes;

first and second countershafts (VW1, VW2) being arranged coaxially with one another, the first countershaft (VW1) being a hollow shaft and the second countershaft (VW2) passing through the first countershaft (VW1);

a drive output shaft (AB1) of the main transmission (10) being arranged coaxially with the first and the second transmission input shafts (EW1, EW2) and forming a drive input shaft of the group transmission (11);

drive input sides of the first powershift clutch (K1) and the electric machine (EM) are connected to a drive aggregate;

a first fixed gear wheel (12) being arranged on the second transmission input shaft (EW2) and meshing with a second fixed gear wheel (13) on the second countershaft (VW2);

a first loose gear wheel (14) being engagable by a first interlocking shifting element (A) and a second loose gear wheel (15) being engagable by a second interlocking shifting element (B), and both the first and the second loose gear wheels (14, 15) being arranged on the first transmission input shaft (EW1);

each of the first and the second loose gear wheels meshing with a respective one of a third (16) and a fourth (17) fixed gear wheel on the first countershaft (VW1);

the second engagable loose gear wheel (15) being either detachably connectable in a rotationally fixed manner, via the second interlocking shifting element (B), to the first transmission input shaft (EW1) or, via a third interlocking shifting element (C), to the drive output shaft (AB1) of the main transmission (10);

a third loose gear wheel (18), arranged on the drive output shaft (AB1) of the main transmission (10), meshing with a fifth fixed gear wheel (19) arranged on the first countershaft (VW1), and the third loose gear wheel (18) being engagable by a fourth interlocking shifting element (D);

the first countershaft (VW1) being detachably engagable, via a fifth interlocking shifting element (E), with the second countershaft (VW2) in a rotationally fixed manner;

a sixth fixed gear wheel (20) being arranged on the drive output shaft (AB1) of the main transmission (10) and meshing with a fourth loose gear wheel (21) arranged on the second countershaft (VW2), and the fourth loose gear wheel (21) being engagable by a sixth interlocking shifting element (F);

a fifth loose gear wheel (22), arranged on the drive output shaft (AB1) of the main transmission (10), being engagable by a seventh interlocking shifting element (G) and meshing with an intermediate gear wheel (23) of an intermediate shaft (24) meshing with a seventh fixed gear wheel (25) arranged on the second countershaft (VW2) to reverse a rotational direction and produce reverse gears and form a reverse-gear wheel plane (6);

the second countershaft (VW2) being detachably connectable to a drive output (AB2) of the group transmission (11) by an eighth shifting element (J, K) to bridge the group transmission (11); and a drive output side of the powershiftable clutch of the other transmission input shaft is connectable, via a further interlocking shifting element (0), to the transmission input shaft connected to the electric machine (EM).

* * * * *